(12) United States Patent
Wheeler et al.

(10) Patent No.: US 8,256,384 B2
(45) Date of Patent: Sep. 4, 2012

(54) MULTIFUNCTIONAL PET LEASH STORAGE DEVICE

(75) Inventors: Greg Wheeler, Chico, CA (US); Rick B. Youra, Chico, CA (US)

(73) Assignee: CleanTracks, LLC, Chico, CA (US)

( * ) Notice: Subject to any disclaimer, the term of this patent is extended or adjusted under 35 U.S.C. 154(b) by 215 days.

(21) Appl. No.: 12/847,334

(22) Filed: Jul. 30, 2010

(65) Prior Publication Data
US 2011/0180016 A1 Jul. 28, 2011

Related U.S. Application Data

(60) Provisional application No. 61/273,196, filed on Jul. 31, 2009.

(51) Int. Cl.
*A01K 27/00* (2006.01)
(52) U.S. Cl. ........................................ 119/795; D30/151
(58) Field of Classification Search .................. 119/795, 119/796; D30/151, 153
See application file for complete search history.

(56) References Cited

U.S. PATENT DOCUMENTS

| | | | |
|---|---|---|---|
| 5,441,017 A | 8/1995 | Lindsay | |
| 5,540,469 A | 7/1996 | Albert | |
| 5,540,569 A * | 7/1996 | Altham et al. | 417/420 |
| 5,826,547 A * | 10/1998 | Gajewska | 119/795 |
| 6,035,809 A | 3/2000 | Fingerett et al. | |
| 6,257,473 B1 | 7/2001 | Ringelstetter | |
| 6,314,917 B1 * | 11/2001 | Ryan | 119/796 |
| 7,073,462 B1 | 7/2006 | Layman | |
| 7,506,615 B1 | 3/2009 | Sansone et al. | |
| 2005/0115520 A1 * | 6/2005 | Mancini | 119/796 |
| 2006/0207522 A1 * | 9/2006 | Perkitny | 119/796 |
| 2007/0204805 A1 * | 9/2007 | Brody | 119/796 |
| 2009/0261604 A1 * | 10/2009 | Rodriguez et al. | 294/1.3 |
| 2011/0197820 A1 * | 8/2011 | Goldy et al. | 119/61.5 |

FOREIGN PATENT DOCUMENTS
GB 2439404 A * 12/2007
* cited by examiner

*Primary Examiner* — Kimberly Berona
*Assistant Examiner* — Joshua Huson
(74) *Attorney, Agent, or Firm* — John P. Costello; Costello Law Corp.

(57) ABSTRACT

The present invention is a multifunctional pet leash storage device for collecting and disposing animal waste. The multifunctional pet leash storage device comprises a leash housing, a waste storage compartment, a sanitary compartment, a sanitary wipe dispensing slot, a sanitary bag dispensing slot, a leash securing hole, a front lid button, a rear lid button, a handle and a battery storage compartment. The sanitary compartment includes a sanitary wipe storage area and a sanitary bag storage area. The sanitary wipe dispensing slot and the sanitary bag dispensing slot are bilaterally symmetrical to each other. The bilaterally symmetrical arrangement of the sanitary wipe dispensing slot and the sanitary bag dispensing slot provides good balance characteristics to the multifunctional pet leash storage device and an easy access of the at least one sanitary bag and the at least one sanitary wipe from the sanitary compartment.

12 Claims, 7 Drawing Sheets

MULTIFUNCTIONAL PET LEASH STORAGE DEVICE

CROSS-REFERENCE TO RELATED APPLICATIONS

This patent application claims the benefit of U.S. provisional patent application Ser. No. 61/273,196 filed on Jul. 31, 2009.

TECHNICAL FIELD

This invention relates to the field of pet leashes, and more particularly, to a multifunctional pet leash storage device that provides an efficient way to store several accessories used while walking pets.

DISCUSSION OF RELATED ART

A wide variety of pet leash devices have been developed in the art. These devices provide comfort, control and safety to pet owners while walking or training their pets. Conventional pet leash devices available in the market come with sanitary containers for holding animal waste. Often, the pet leash devices are designed to hold necessary items such as waste collecting means, sanitary wipes, money or an extra leash, carried by the pet owners while going for a walk. Yet conventional pet leash storage devices have some drawbacks, principally being that they are bulky and uncomfortable to use and are not economical.

One prior art device described in U.S. Pat. No. 7,073,462 issued to Layman on Jul. 11, 2006, describes an organizer for assisting a user while taking a dog for a walk. The organizer has an adjustable belt with an interlocking buckle and an attached pouch. The pouch has a top lid and front, left and right surfaces. The user can insert a box of plastic bags in a bag compartment inside a side zipper in the left surface and the bags can be dispensed through an elongated slot in the front surface to collect dog waste. A solar energy panel is located on the lid and is in communication with a light-emitting diode. However, the organizer has no provision to hold the pet waste once it is retrieved from the ground and it does not have a light source to provide a wide beam of light. Moreover, the organizer has no provision to conveniently hold and dispense sanitary wipes to sanitize the hands of the user.

Another prior art device described in U.S. Pat. No. 6,257,473 issued to Ringelstetter on Jul. 10, 2001, describes a sanitary pet-waste collection pouch. The pouch includes an interior open-topped chamber for holding tied loaded plastic bags containing retrieved pet-waste, deep-side pockets for carrying a hand-sanitizer dispensing container. Even so, the sanitary collection holder's complex structure causes difficulty when cleaning the sanitary pet-waste collection pouch.

U.S. Pat. No. 6,035,809 issued to Fingerett on Mar. 14, 2000, describes a leash pouch for holding disposable bags and animal waste when walking animals. The leash pouch attaches to a leash using a mounting device to free the pet owner's hands. A disposable bag compartment is on the left surface of the pouch and a waste compartment is located on the right surface of the pouch. The pet owner picks up the waste with a disposable bag and places it in the waste compartment for later disposal. However, such a leash pouch requires an additional mounting device to attach with the leash and hence the leash pouch is not economical. Further, a user cannot easily access the waste compartment in the leash pouch.

Therefore, there is a need for a multifunctional pet leash storage device that provides an efficient way to manage several accessories used while walking pets in a single device. Such a device would provide an easily accessible storage compartment to hold the pet waste and a means to hold and dispense sanitary wipes. Moreover, such a device would have a simple structure and would be economical. Further, such a device would have storage means for securing the pet leash and a bright light source. The present invention accomplishes these objectives.

SUMMARY OF THE INVENTION

The present invention is a multifunctional pet leash storage device for collecting and disposing animal waste. The multifunctional pet leash storage device comprises a leash housing, a waste storage compartment, a sanitary compartment, a sanitary wipe dispensing slot, a sanitary bag dispensing slot, a leash securing hole, a front lid button, a rear lid button, a handle and a battery storage compartment. The leash housing includes a top surface, a bottom surface, a rear portion, a front portion, a left surface and a right surface. The handle at the top surface of the leash housing includes a flashlight, a flashlight button and a leash button. The handle also can have a panic button which could set off an audible alarm as an additional accessory. The sanitary wipe dispensing slot and the sanitary bag dispensing slot are bilaterally symmetrical to each other. The sanitary compartment includes a sanitary wipe storage area and a sanitary bag storage area. The sanitary wipe storage area and the sanitary bag storage area store at least one sanitary wipe and at least one sanitary bag respectively. The bilaterally symmetrical arrangement of the sanitary wipe dispensing slot and the sanitary bag dispensing slot provides a good balance characteristics to the multifunctional pet leash storage device and an easy access of the at least one sanitary bag and the at least one sanitary wipe from the sanitary compartment.

The at least one sanitary bag is designed to collect animal waste. The waste storage compartment is adaptable to hold the at least one sanitary bag filled with the animal waste. The leash securing hole at the front portion of the leash housing secures a retractable pet leash. The leash button at the handle is pressed to lock and unlock the leash securing hole. When the leash securing hole is unlocked, the retractable pet leash is released from the leash securing hole. The sanitary wipe storage area and the sanitary bag storage area is refillable with the at least one sanitary wipe and at least one sanitary bag respectively. The at least one sanitary wipe is utilized to sanitize hands of a user. The waste storage compartment and the sanitary compartment include a lid cover thereof to open and close the waste storage compartment and the sanitary compartment. The front portion of the leash housing includes a front lid button that is pressed to open the lid cover of the sanitary storage compartment. The rear portion of the leash housing includes a rear lid button to open the lid cover of the waste compartment. The front lid button and the rear lid button eliminate the need for touching the at least one sanitary bag having animal waste directly.

The rear portion of the leash housing includes the battery storage compartment. The battery storage compartment stores and charges at least one battery for the flashlight. The flashlight generates a wide beam light that helps the user while walking a pet at night. The flashlight button located at the handle is utilized to switch on and switch off the flashlight.

The batteries could also be used to power a panic alarm which would be activated by placing a panic button on the handle.

DETAILED DESCRIPTION OF THE PREFERRED EMBODIMENT

Figure 1:
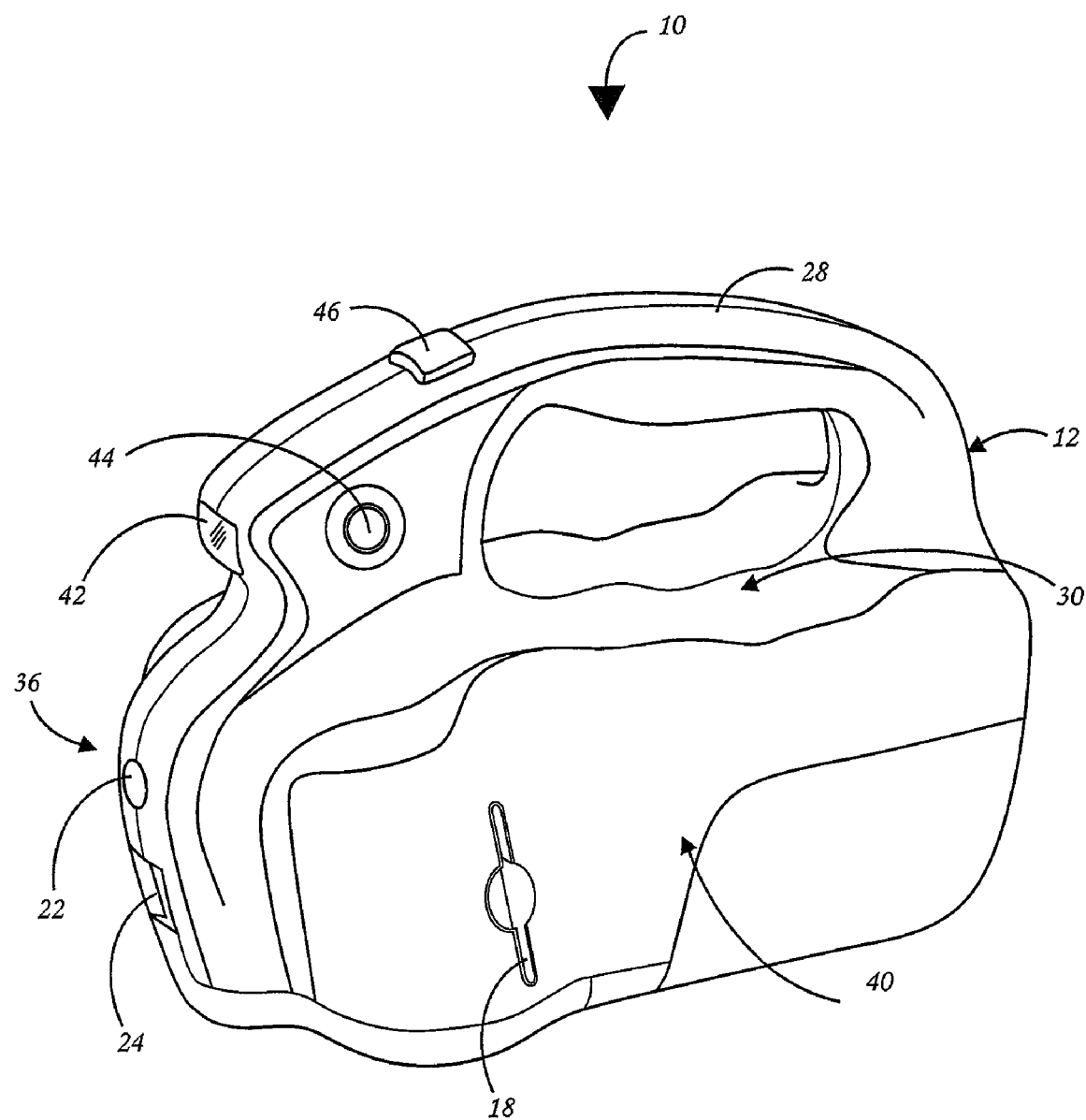
FIG. 1 is a perspective view of a multifunctional pet leash storage device of the present invention.
Figure 2:
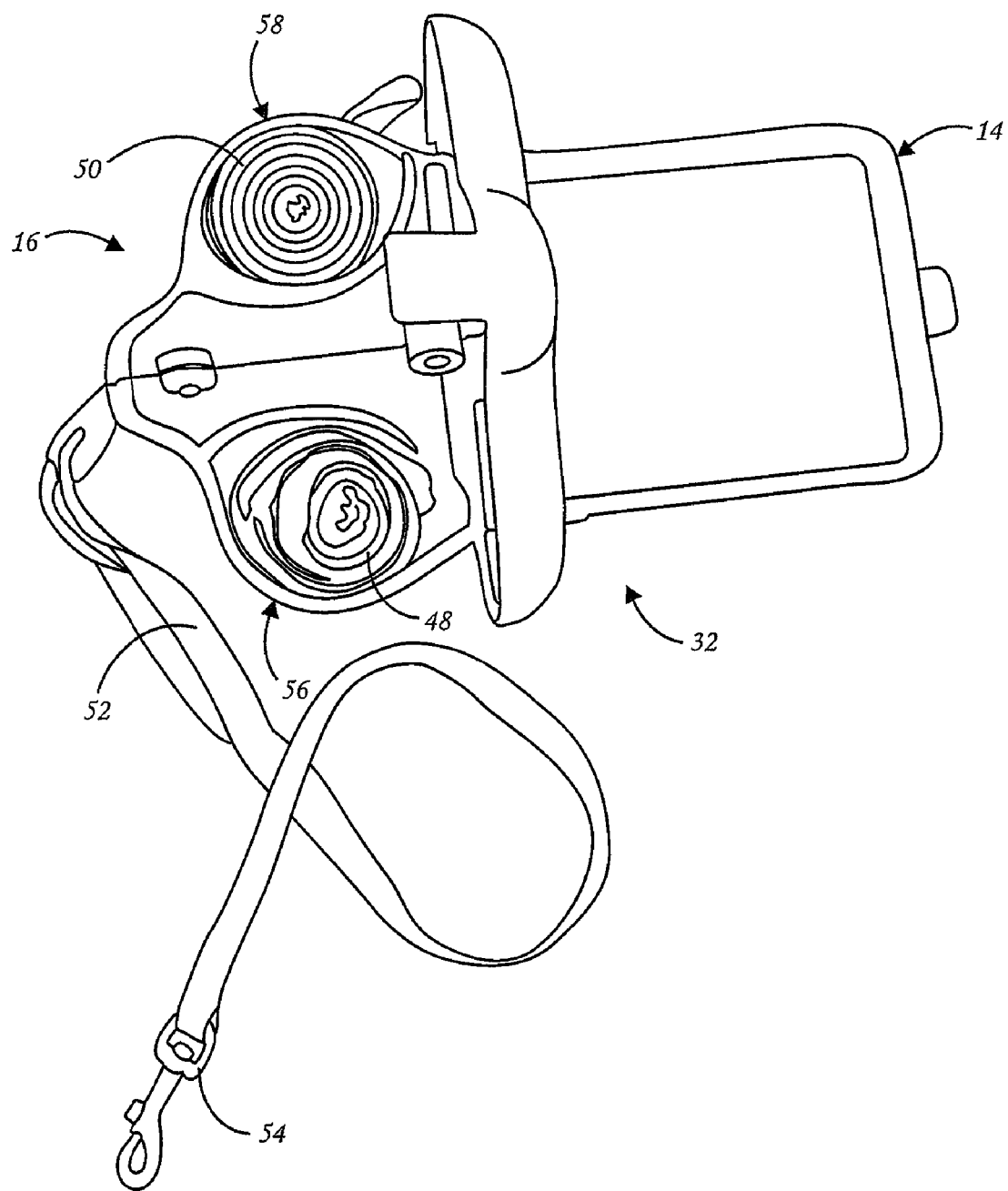
FIG. 2 is a perspective view of the multifunctional pet leash storage device, illustrating a bottom surface of a leash housing.

Referring now specifically to the drawings, FIGS. 1 and 2 show a multifunctional pet leash storage device 10 for collecting and disposing animal waste. The multifunctional pet leash storage device 10 comprises a leash housing 12, a waste storage compartment 14, a sanitary compartment 16, a sanitary wipe dispensing slot (not shown), a sanitary bag dispensing slot 18, a leash securing hole 22, a front lid button 24, a rear lid button (not shown), a handle 28 and a battery storage compartment (not shown). The leash housing 12 includes a top surface 30, a bottom surface 32, a rear portion (not shown), a front portion 36, a left surface (not shown) and a right surface 40. The handle 28 at the top surface 30 of the leash housing 12 includes a flashlight 42, a flashlight button 44 and a leash button 46.

The sanitary compartment 16 includes a sanitary wipe storage area 56 and a sanitary bag storage area 58. The sanitary wipe storage area 56 and the sanitary bag storage area 58 store at least one sanitary wipe 48 and at least one sanitary bag 50 respectively. The sanitary wipe dispensing slot (not shown) and the sanitary bag dispensing slot 18 are bilaterally symmetrical to each other. The bilaterally symmetrical arrangement of the sanitary wipe dispensing slot (not shown) and the sanitary bag dispensing slot 18 provides a good balance characteristics to the multifunctional pet leash storage device 10 and an easy access of the at least one sanitary wipe 48 and the at least one sanitary bag 50 from the sanitary compartment 16. The at least one sanitary bag 50 is designed to collect animal waste. The waste storage compartment 14 is adaptable to hold the at least one sanitary bag 50 filled with the animal waste.

FIG. 2 shows a retractable pet leash 52 designed to secure in the leash securing hole 22 at the front portion 36 of the leash housing 12. The leash button 46 at the handle 28 is pressed to lock and unlock the leash securing hole 22. When the leash securing hole 22 is unlocked, the retractable pet leash 52 is released from the leash securing hole 22. The retractable pet leash 52 includes a snap lock 54 to connect with a pet collar (not shown) worn by a pet.

Figure 3:
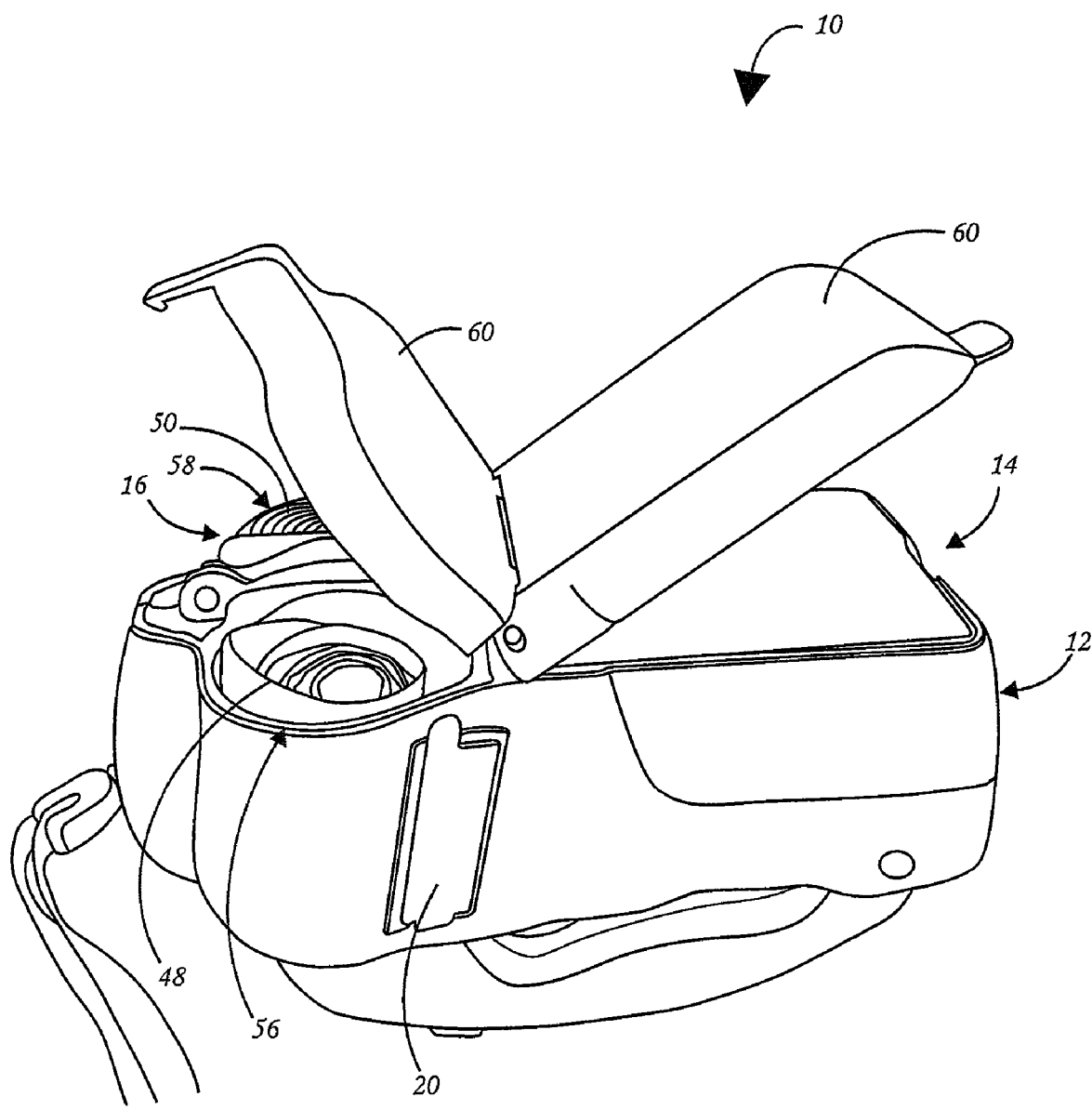
FIG. 3 is a perspective view of the multifunctional pet leash storage device, illustrating a sanitary compartment and a waste storage compartment in an open state.

As shown in FIG. 3, the sanitary wipe storage area 56 and the sanitary bag storage area 58 are refillable with the at least one sanitary wipe 48 and at least one sanitary bag 50 respectively. The sanitary wipe dispensing slot 20 at the left surface 38 of the leash housing 12 is designed to dispense the at least one sanitary wipe 48 and the sanitary bag dispensing slot 18 at the right surface 40 is designed to dispense the at least one sanitary bag 50. The at least one sanitary wipe 48 is utilized to sanitize hands of a user. The waste storage compartment 14 and the sanitary compartment 16 include a lid cover 60 thereof to open and close the waste storage compartment 14 and the sanitary compartment 16. The front lid button 24 at the front portion 36 of the leash housing 12 is pressed to open the lid cover 60 of the sanitary storage compartment 16. The animal waste collected in the at least one sanitary bag 50 is disposed by opening the waste storage compartment 14. The rear portion (not shown) of the leash housing 12 includes a rear lid button (not shown) to open the lid cover 60 of the waste compartment 14. The front lid button 24 and the rear lid button (not shown) eliminate the need for directly touching the at least one sanitary bag 50 having animal waste.

Figure 4:
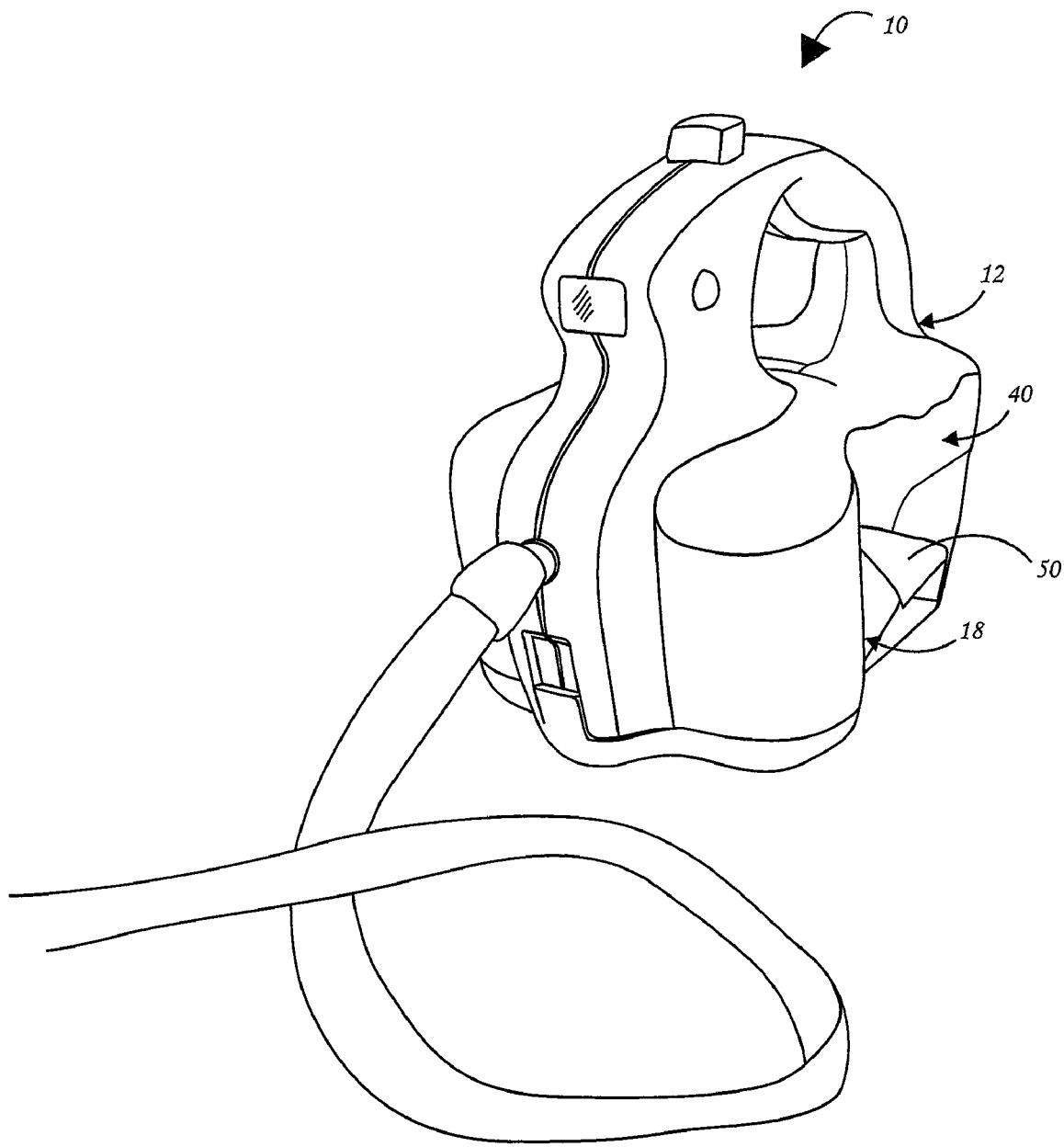
FIG. 4 is a perspective view of the multifunctional pet leash storage device, illustrating at least one sanitary bag emerging from the sanitary bag dispensing slot.
Figure 5:
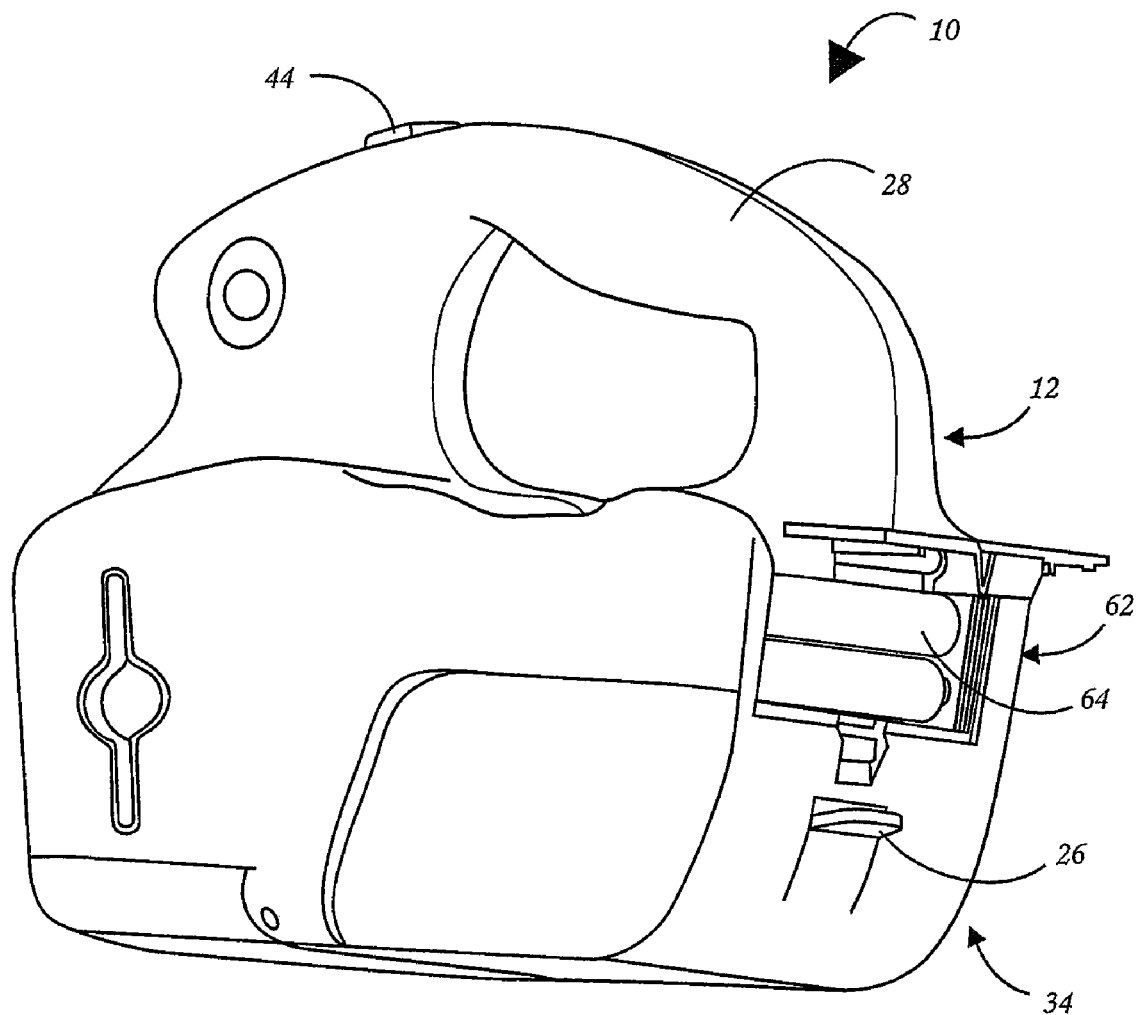
FIG. 5 is a perspective view of the multifunctional pet leash storage device, illustrating a battery storage compartment.

FIG. 4 illustrates the at least one sanitary bag 50 emerging from the sanitary bag dispensing slot 18 located at the right surface 40 of the leash housing 12. As shown in FIG. 5, the rear portion 34 of the leash housing 12 includes the battery storage compartment 62. The battery storage compartment 62 stores and charges at least one battery 64 for the flashlight 42. The flashlight 42 generates a wide beam light that helps the user for a pet walk at night. The flashlight button 44 located at the handle 28 is utilized to switch on and switch off the flashlight 42. A panic button (not shown) could be located on the handle similarly to the flashlight button 44, which could activate a panic alarm (not shown) powered by batteries in the battery storage compartment 62. The rear lid button 26 at the rear portion 34 is used to open the lid cover 60 of the waste compartment 14.

Figure 6:
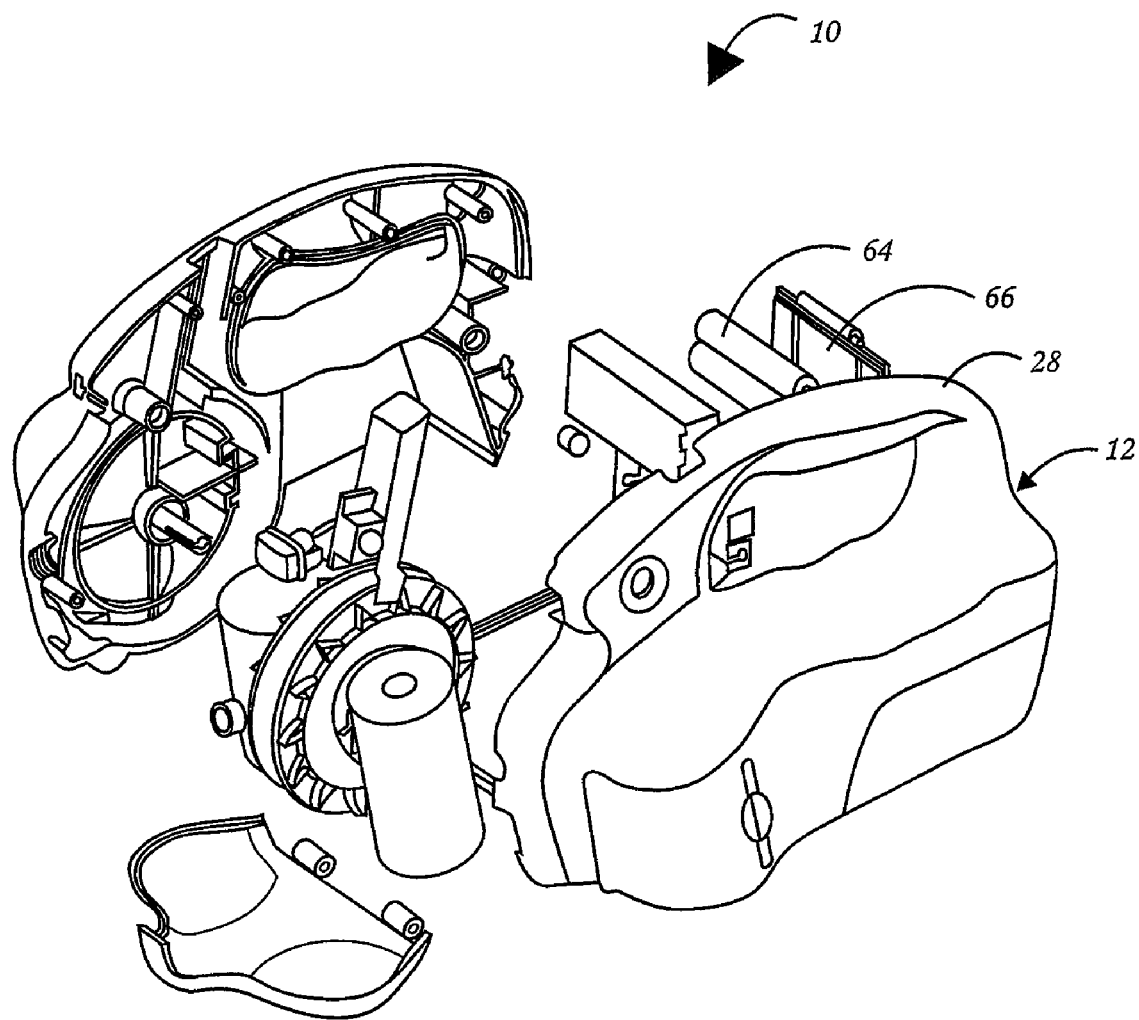
FIG. 6 is an exploded view of the multifunctional pet leash storage device of FIG. 1 of the present invention.

FIG. 6 shows an exploded view of the multifunctional pet leash storage device 10. The lid cover 60 utilizes a hinge means for strongly retaining with the waste storage compartment 14 and the sanitary compartment 16. The handle 28 may be made of molded soft rubber to provide better grip and to reduce fatigue. The battery storage compartment 62 includes a lid 66 for closing and opening the battery storage compartment 62 having the at least one battery 64.

Figure 7:
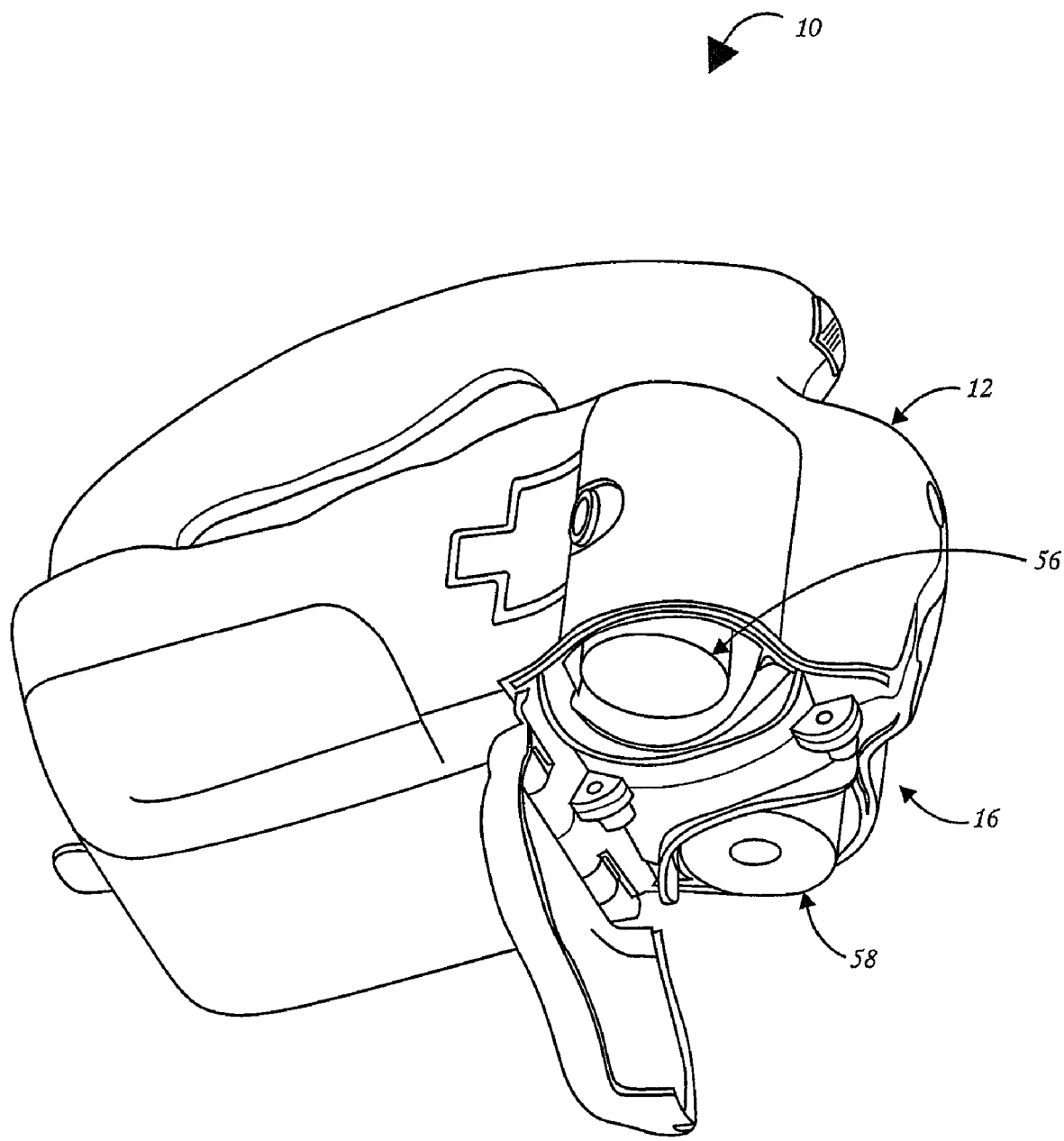
FIG. 7 is a perspective view of the multifunctional pet leash storage device, illustrating the sanitary compartment.

Referring to FIG. 7, the sanitary compartment 16 having the sanitary wipe storage area 56 and the sanitary bag storage area 58 is illustrated. The sanitary wipe storage area 56 and the sanitary bag storage area 58 are refilled utilizing a novel packaging technology.

This invention may be altered and rearranged in numerous ways by one skilled in the art without departing from the coverage of any patent claims which are supported by this specification. For example, an accessory pouch (not shown) could be included to attach to the device at the handle to carry extra items, such as a cell phone.

The foregoing written description describes a multifunctional pet leash storage device 10 for collecting and dispensing animal waste. Finally, although the description above contains many specificities, these should not be construed as limiting the scope of the invention, but as merely providing illustrations of some of the presently preferred embodiments of this invention.

The invention claimed is:
1. A multifunctional pet leash storage device, comprising:
a leash housing having a top surface, a bottom surface, a rear portion, a front portion, a left surface and a right surface, said housing containing a retractable pet leash therein;
a waste storage compartment at said bottom surface of said leash housing;

a sanitary compartment having a sanitary bag storage area and a sanitary wipe storage area at said bottom surface of said leash housing;

a sanitary wipe dispensing slot at said left surface of said leash housing to dispense at least one sanitary wipe stored in said sanitary wipe storage area;

a sanitary bag dispensing slot at said right surface of said leash housing to dispense at least one sanitary bag stored in said sanitary bag storage area, said sanitary bag dispensing slot being bilaterally symmetrical with said sanitary wipe dispensing slot;

a leash securing hole at said front portion of said leash housing for securing said retractable pet leash;

a front lid button at said front portion to open said sanitary compartment;

a rear lid button at said rear portion of said leash housing to open said waste storage compartment;

a handle at said top surface of said leash housing, said handle includes a flashlight, a flashlight button and a leash button; and a battery storage compartment at the rear portion of the leash housing;

whereby the bilaterally symmetrical arrangement of said sanitary wipe dispensing slot and said sanitary bag dispensing slot provides good balance characteristics to said multifunctional pet leash storage device and an easy access of said at least one sanitary bag and said at least one sanitary wipe from said sanitary compartment.

2. The multifunctional pet leash storage device as recited in claim 1, wherein said at least one sanitary bag is designed to collect animal waste.

3. The multifunctional pet leash storage device as recited in claim 1, wherein said waste storage compartment is adaptable to hold said at least one sanitary bag.

4. The multifunctional pet leash storage device as recited in claim 1, wherein said sanitary wipe storage area is refillable with said at least one sanitary wipe.

5. The multifunctional pet leash storage device as recited in claim 1, wherein said sanitary bag storage area is refillable with said at least one sanitary bag.

6. The multifunctional pet leash storage device as recited in claim 1, wherein said flashlight button is utilized to switch on and switch off said flashlight.

7. The multifunctional pet leash storage device as recited in claim 1, wherein said leash button is adaptable to lock and unlock said leash securing hole.

8. The multifunctional pet leash storage device as recited in claim 1, wherein said waste storage compartment and said sanitary compartment include a lid cover thereof to open and close said waste storage compartment and said sanitary compartment.

9. The multifunctional pet leash storage device as recited in claim 1, wherein the battery storage compartment stores at least one battery for the flashlight.

10. The multifunctional pet leash storage device as recited in claim 1, further comprising a panic button connected to a panic alarm.

11. A multifunctional pet leash storage device, comprising:
a leash housing having a top surface, a bottom surface, a rear portion, a front portion, a left surface and a right surface, said housing containing a retractable pet leash therein;

a waste storage compartment in said housing;

a sanitary compartment having a sanitary bag storage area and a sanitary wipe storage area in said housing;

a sanitary wipe dispensing slot imparted in said housing to dispense at least one sanitary wipe stored in said sanitary wipe storage area;

a sanitary bag dispensing slot imparted in said housing to dispense at least one sanitary bag stored in said sanitary bag storage area, said sanitary bag dispensing slot being bilaterally symmetrical with said sanitary wipe dispensing slot;

a leash securing feature for securing said retractable pet leash;

a lid button to open said sanitary compartment;

a lid button to open said waste storage compartment;

a handle at said top surface of said leash housing; and a battery storage compartment in said housing;

whereby the bilaterally symmetrical arrangement of said sanitary wipe dispensing slot and said sanitary bag dispensing slot provides good balance characteristics to said multifunctional pet leash storage device and an easy access of said at least one sanitary bag and said at least one sanitary wipe from said sanitary compartment.

12. A multifunctional pet leash storage device, comprising:
a leash housing having a top surface, a bottom surface, a rear portion, a front portion, a left surface and a right surface, said housing containing a retractable pet leash therein;

a waste storage compartment in said housing;

a sanitary compartment having a sanitary bag storage area and a sanitary wipe storage area in said housing, wherein said bag storage area and said wipe storage area are bilaterally symmetrical in said housing;

a sanitary wipe dispensing slot imparted in said housing in communication with said sanitary compartment to dispense at least one sanitary wipe stored in said sanitary wipe storage area;

a sanitary bag dispensing slot imparted in said housing in communication with said sanitary compartment to dispense at least one sanitary bag stored in said sanitary bag storage area;

a leash securing feature for securing said retractable pet leash;

a lid button to open said sanitary compartment;

a lid button to open said waste storage compartment;

a handle at said top surface of said leash housing; and a battery storage compartment in said housing;

whereby the bilaterally symmetrical arrangement of said sanitary wipe storage area and said sanitary bag storage area provides good balance characteristics to said multifunctional pet leash storage device and an easy access of said at least one sanitary bag and said at least one sanitary wipe from said sanitary compartment.

* * * * *